United States Patent
Moegele

(10) Patent No.: US 12,179,623 B2
(45) Date of Patent: Dec. 31, 2024

(54) METHOD FOR COORDINATING CHARGING AND/OR FILLING OF AN ENERGY STORAGE DEVICE OF A MOTOR VEHICLE, STORAGE MEDIUM, MOBILE TERMINAL, SERVER DEVICE, NAVIGATION DEVICE, AND MOTOR VEHICLE

(71) Applicant: AUDI AG, Ingolstadt (DE)

(72) Inventor: Hannes Moegele, Guenzach (DE)

(73) Assignee: AUDI AG, Ingolstadt (DE)

( * ) Notice: Subject to any disclaimer, the term of this patent is extended or adjusted under 35 U.S.C. 154(b) by 403 days.

(21) Appl. No.: 17/153,005

(22) Filed: Jan. 20, 2021

(65) Prior Publication Data
US 2021/0245618 A1  Aug. 12, 2021

(30) Foreign Application Priority Data

Feb. 6, 2020 (DE) ...................... 10 2020 103 025.8

(51) Int. Cl.
*B60L 53/63* (2019.01)
*B60L 53/60* (2019.01)
(Continued)

(52) U.S. Cl.
CPC .............. *B60L 53/63* (2019.02); *B60L 53/60* (2019.02); *B60L 53/64* (2019.02); *B60L 53/66* (2019.02);
(Continued)

(58) Field of Classification Search
CPC .......... B60L 53/63; B60L 53/60; B60L 53/64; B60L 53/66; B60L 53/68; B60L 2240/70;
(Continued)

(56) References Cited

U.S. PATENT DOCUMENTS 9,744,873 B2 * 8/2017 Riley ...................... B60L 58/12
2007/0112475 A1 5/2007 Koebler et al.
(Continued)

FOREIGN PATENT DOCUMENTS

CN 103443588 A 12/2013
CN 108016305 A 5/2018
(Continued)

OTHER PUBLICATIONS

Examination Report issued on Jul. 17, 2020 in corresponding German application No. 10 2020 103 025.8; 16 pages including Machine-generated English-language translation.
(Continued)

*Primary Examiner* — Richard Isla
*Assistant Examiner* — Manuel Hernandez
(74) *Attorney, Agent, or Firm* — Maier & Maier, PLLC

(57) ABSTRACT

A method for coordinating charging and/or filling of an energy storage device of a motor vehicle. A navigation device determines user-specific appointment data having location coordinates, a departure location of the motor vehicle, and energy storage data for a state of charge and/or a fill level, and environmental data for a specified time range. The navigation device provides a digital agenda model, which describes the determined data, as well as map data for the respective locations and for at least one energy delivery device, and uses the agenda model to determine at least one travel plan for keeping the at least one appointment. As a function of the determined energy storage data, the respective travel route takes into consideration at least one location of an energy delivery device as an intermediate destination having a charging and/or filling time.

13 Claims, 5 Drawing Sheets

(51) Int. Cl.
  *B60L 53/64* (2019.01)
  *B60L 53/66* (2019.01)
  *B60L 53/68* (2019.01)
  *G01C 21/34* (2006.01)
(52) U.S. Cl.
  CPC .......... *B60L 53/68* (2019.02); *G01C 21/3415* (2013.01); *G01C 21/3469* (2013.01); *B60L 2240/70* (2013.01); *B60L 2260/52* (2013.01)
(58) Field of Classification Search
  CPC ............ B60L 2260/52; G01C 21/3415; G01C 21/3469
  USPC ......................................................... 320/109
  See application file for complete search history.

(56) References Cited

U.S. PATENT DOCUMENTS

| | | | | |
|---|---|---|---|---|
| 2014/0052374 | A1* | 2/2014 | Hoch | G01C 21/343 701/533 |
| 2014/0372904 | A1* | 12/2014 | Liu | G01C 21/3415 715/753 |
| 2018/0118188 | A1* | 5/2018 | Bauerle | B60W 10/06 |
| 2018/0143029 | A1* | 5/2018 | Nikulin | G01C 21/3415 |
| 2019/0160958 | A1* | 5/2019 | Chaudhary | B60L 53/665 |
| 2019/0322174 | A1* | 10/2019 | Koebler | B60L 7/12 |
| 2020/0217679 | A1* | 7/2020 | DeLuca | G01C 21/3484 |
| 2020/0317077 | A1* | 10/2020 | Schaffer | B60L 53/305 |
| 2020/0376972 | A1* | 12/2020 | Martin | B60L 53/63 |

FOREIGN PATENT DOCUMENTS

| | | |
|---|---|---|
| CN | 110053513 A | 7/2019 |
| DE | 10 2011 015 775 A1 | 10/2012 |
| DE | 10 2013 007 525 A1 | 10/2014 |
| DE | 10 2017 125 449 A1 | 5/2018 |
| DE | 10 2017 216 748 A1 | 3/2019 |
| DE | 10 2019 101 182 A1 | 7/2019 |
| DE | 10 2018 210 839 A1 | 1/2020 |

OTHER PUBLICATIONS

Office Action issued on Oct. 25, 2023, in corresponding Chinese Application No. 202110153193.4, 18 pages.

* cited by examiner

METHOD FOR COORDINATING CHARGING AND/OR FILLING OF AN ENERGY STORAGE DEVICE OF A MOTOR VEHICLE, STORAGE MEDIUM, MOBILE TERMINAL, SERVER DEVICE, NAVIGATION DEVICE, AND MOTOR VEHICLE

FIELD

The disclosure relates to a method for coordinating charging and/or filling of an energy storage device of a motor vehicle. An energy storage device is understood to be a component or a group of components for storing an electrical and/or chemical energy carrier, for example, and can be designed, for example, as a fuel tank for gasoline or gas, and/or as a rechargeable battery or traction battery for storing electricity, and/or as a combination of a fuel tank and a traction battery.

BACKGROUND

With increasing mobility, the motor vehicle is becoming more and more important in daily use. For a user, in particular a driver, it is not transparent how he successfully completes a complex route with an optimal number of charging stops. This results in range anxiety, especially in motor vehicles having an electric drive, so that the driver is constantly unsure whether the range will last until the next charging station. In order to organize planning for an entire day, for example, many manual entries are necessary, and the driver always drives to a gas station, charging station or filling station that he happens to know, that he happens to see while driving, or that has determined by extensive preliminary planning.

The charging stop planning therefore has to be carried out manually and step by step. The effort to create a plan lies with the user of the motor vehicle. In the case of multi-stage routes, i.e., routes having multiple intermediate stops, the effort increases many times over. In addition, there are unnecessary downtimes.

DE 10 2017 216 748 A1 describes a method for coordinating a charging process for charging an energy storage device of a piloted motor vehicle.

A method is known from DE 10 2019 101 182 A1, which includes controlling the charging of a battery pack of an electrified vehicle via a control system of the electrified vehicle on the basis of weather conditions, traffic conditions, and learned driving habits of a driver of the electrified vehicle.

DE 10 2013 007 525 A1 describes a method and a device for regulating the charge of an electrical energy store in vehicles.

SUMMARY

An underlying object of the disclosure is to optimize the coordination of a charging and/or filling process for charging and/or filling an energy storage device for a travel route using the motor vehicle.

The stated object is achieved by the method according to the disclosure and the devices according to the disclosure The disclosure is based on the idea of pairing user-specific data, energy storage-specific data, and data on motor vehicle-external influences on a journey or series of journeys using the motor vehicle in an agenda model with energy delivery device-specific parameters and using the agenda model to determine a travel route, wherein the travel plan provides filling and/or charging stops at reasonable locations and/or at reasonable times. An energy delivery device is understood to mean a device for delivering an energy carrier, for example for refueling with gasoline, filling with hydrogen or another gas, or for charging the energy storage device with electricity. An energy delivery device can therefore be designed, for example, as a fuel pump, charging column, or filling station for filling a tank with hydrogen.

In other words, the travel plan provides that from a framework of user-specific data for at least one appointment having corresponding geographical coordinates of an appointment location and from motor vehicle-external environmental data, energy storage-specific data, and the starting point of the journey, reasonable charging and/or filling stops are derived as intermediate destinations. In particular, a plurality of appointments can be taken into consideration according to the disclosure, that is to say a more complex travel route can be provided and the user can thereby be supported or completely relieved with more complex refueling and/or charging coordination. The method according to the disclosure can provide the optimal number of charging stops, i.e., for example, more charging stops which are of shorter duration, however, can be more optimal than few charging stops of longer duration. Within the optimal number, the variant with the lowest number of stops can preferably be used. The planning is organized in such a way that as little as possible or no additional time, more precisely little or no waiting time, is required for the charging.

In other words, reasonable charging or filling stops are preferably taken into consideration in a chain of appointments to be approached. Such an automated travel plan is carried out for a specified time range or time period, thus, for example for a current day. The different parameters taken into consideration work together synergistically and are incorporated into the proposed travel route. The user of the motor vehicle ideally only requires one interaction step for the complete planning, for example by way of a speech-based initiation or by way of a one-touch solution. The initial call of the user to activate the charging stop planning can therefore preferably be done verbally or via touch interaction. The user does not have to carry out any complex planning processes himself. For the user, there is also a faster and more accurate planning result, the cognitive load is reduced, both during the journey, but also before the journey, and range anxiety is reduced or even eliminated.

The method according to the disclosure for coordinating charging and/or filling of an energy storage device of a motor vehicle comprises the following steps carried out by a navigation device. A navigation device is understood to mean a device, a device component, or a device group that is designed to receive signals and evaluate them, to calculate routes, and to generate control signals. The navigation device can alternatively also be referred to as a control device. The navigation device or control device can be designed, for example, as a navigation device, as a control chip, or as a control unit.

The navigation device carries out the following steps for a given time range, for example for a current day or a specified day. The time range can optionally be specified by a user input or can be preset.

The navigation device establishes user-specific appointment data with location coordinates associated with at least one appointment, thus, for example two appointments on the current day and their respective geographic locations. In other words, the navigation device determines user-specific parameters in this step. Ideally, the determined appointment data describe at least two appointments having respective locations, i.e., a plurality of appointments in the specified time period.

The navigation device determines a departure location of the motor vehicle at the beginning of the specified time range, i.e., the starting point for navigation, and determines energy storage data. The energy storage data describe a state of charge and/or a fill level of the energy storage device at the beginning of the specified time range. In other words, in this step the navigation device determines the starting position of the motor vehicle, as well as energy storage-specific parameters.

The navigation device determines environmental data that describe at least one journey-relevant, motor vehicle-external environmental parameter, i.e., for example traffic data for a traffic jam or traffic conditions and/or weather data.

The navigation device provides a digital agenda model which describes the determined appointment data and the determined environmental data. In addition, the digital, provided agenda model describes map data of a geographic area that includes the respective locations—i.e., the locations at which the at least one appointment takes place, as well as the departure location of the motor vehicle—and at least one location of an energy delivery device, for example multiple locations of gas stations and charging stations. The provided agenda model also describes the determined environmental data.

On the basis of the provided agenda model, the navigation device determines at least one travel plan having a travel route for keeping the at least one appointment for the specified time range. The travel plan can preferably not only include a combination of navigation routes from the departure location to the first appointment, from the first appointment to the second appointment, and so on, but also time specifications for the duration of the respective appointment and travel times.

As a function of the determined energy storage data, the respective travel route takes into consideration at least one location of an energy delivery device as an intermediate destination having a charging and/or filling time, so that the considered intermediate destination fulfills a specified expediency criterion. Ideally, the respective travel route can therefore be determined as a function of the determined energy storage data and at least one location of an energy delivery device.

The specified expediency criterion describes a specification to the effect that the intermediate destinations, that is to say the charging stops, are expediently integrated into the travel plan, so that the user has as little waiting time as possible. This can mean, for example, that particularly inexpensive energy delivery devices are prioritized, or that the charging stops are integrated in a very time-efficient manner during the lunch break or during an appointment.

The navigation device transmits the at least one determined travel plan to an output device, i.e., for example, to a display screen of the motor vehicle and/or a mobile terminal of the user. An output device is understood to mean a device or a device group for outputting image and/or audio content. Alternatively or additionally, the navigation device transmits the at least one determined travel plan to a driver assistance system of the motor vehicle.

The method for coordinating charging and/or filling of the energy storage device of the motor vehicle can also be referred to as a method for operating the navigation device and/or the output device and/or the driver assistance system. If the navigation device transmits the at least one determined travel plan to the driver assistance system, then this can preferably be a driver assistance system of a piloted motor vehicle. In this case, the navigation device can additionally generate a control signal for controlling the motor vehicle along the travel route of the at least one travel plan and transmit it to the driver assistance system. The piloted motor vehicle can then be controlled along the travel routes from appointment to appointment and to the at least one charging stop. In this variant, the method according to the disclosure can also be referred to as a method for controlling a piloted motor vehicle.

The advantages mentioned above result.

According to one embodiment of the method according to the disclosure, the specified expediency criterion can prescribe: the least possible delay in travel time, and/or the least possible extension of the travel route, and/or a maximum cost—i.e., an upper limit of a cost—of the charging and/or filling process and/or—for cost optimization—the lowest possible cost of the charging and/or filling process, and/or the availability of an energy carrier, for example gasoline, hydrogen, or electricity, from an environmentally friendly renewable energy source, and/or a specified maximum distance of the energy delivery device to a location of the at least one appointment. The expediency criterion can optionally be input by the user or stored as a standard setting, or learned by the system, for example by the navigation device. Additionally or alternatively, the specified expediency criterion can also describe the reservability of the energy delivery device and/or the availability of an energy delivery device.

When taking renewable energies into consideration, charging stations whose energy source, i.e., electricity is so-called "green electricity" can be preferred, for example. If the least possible delay in travel time is prioritized, a lunch break or the duration of an appointment can be taken into consideration as a charging stop at a nearby charging station. With the smallest possible extension of the travel route, i.e., the least possible influence of the "detour" to the charging stop, it can advantageously be taken into consideration that the available range possibly still comprises a location of an appointment and refueling and/or charging only has to be carried out after the appointment. The specified maximum distance between the energy delivery device and a location of at least one appointment is also reflected in the total travel time and the total length of the journey.

If the lowest possible cost expenditure is prioritized, special promotions from gas stations or charging stations can be included in the travel plan, for example. If the availability of the energy carrier, for example gasoline or electricity, is taken into consideration, and/or the availability and/or reservability of a fuel pump, a filling station, or a charging column, delays caused by long waiting times or the need to re-plan to another filling station or charging column are reduced or even avoided.

For example, for particularly cost-effective charging, a charging station can preferably be considered where charging is free of charge for the customer, or whether there presently is a special offer at this station. Another advantageous predetermined expediency criterion can take a charging time and/or a filling time of the energy storage device into consideration more strongly, preferably in combination with a performance of the energy delivery device. In this way, charging and/or filling stops can be planned in which the charging time and/or filling time is preferably as short as possible.

Such a categorization by means of the expediency criterion enables weighting and thus significantly influences the mapping of the provided agenda model. The preferred expediency criteria listed here therefore have a major influence on the travel plan and accordingly favor the advantages mentioned above in a synergistic manner.

According to a further embodiment of the method according to the disclosure, the navigation device can additionally take into consideration motor vehicle-specific parameters. For this purpose, the navigation device can determine motor vehicle data, and the provided agenda model describes these determined motor vehicle data. The motor vehicle data can preferably describe whether the motor vehicle is a motor vehicle having a combustion engine, an electric motor vehicle, or a hybrid motor vehicle. Optionally, the determined motor vehicle data can describe that the motor vehicle is a gas-powered motor vehicle, for example a hydrogen-powered motor vehicle. This influences the above-mentioned advantages in a synergistic manner, because a charging time in a hydrogen-powered motor vehicle differs significantly, for example, from the refueling process of an internal combustion engine or a charging process of an electric motor vehicle. In addition, the information that the motor vehicle is a hydrogen-powered motor vehicle results in other ranges, and the infrastructure for filling the hydrogen tank looks correspondingly different. For a hybrid motor vehicle, an energy delivery device can ideally be taken into consideration accordingly, or a station having multiple energy delivery devices, where the user can both fill up the gasoline tank and charge the traction battery. Further advantageous motor vehicle data are, in particular, historical data relating to a ratio of electricity and gasoline consumption in hybrid motor vehicles. Thus, for example, the range, but in any case a reasonable refueling and/or charging stop, can be determined.

Optionally, the navigation device can determine further user-specific data and take them into consideration in the provided agenda model, preferably a driving style of the user of a motor vehicle. Since the driving style has an effect on the consumption of the energy carrier, a range of the motor vehicle can also be better predicted in this embodiment, and intermediate stops for charging and/or filling can thus be determined even more reasonably. Taking into consideration the driving style can also have an advantage for the user insofar as a very sporty driver prefers those roads on which sporty driving is possible.

According to a further embodiment of the method according to the disclosure, the navigation device can determine further energy storage data and take them into consideration in the provided agenda model, preferably data on a battery status and/or a current or predicted range. The advantages have already been explained above. The advantages result from the explanations above.

Ideally, the navigation device can determine a current or predicted availability and/or an ability to reserve an energy delivery device and take it into consideration in the provided agenda model. The advantages have already been discussed above.

As further, optional motor vehicle-external environmental parameters, the environmental data can be data on a traffic situation in the geographic area and/or weather data. These factors not only have a major influence on the travel time, but also on keeping appointments. For example, a departure time from the house of the user can be adapted to a weather condition and/or a current traffic situation, and an intermediate stop for charging and/or filling the energy storage device can possibly be omitted from a very busy road section between two appointments and instead provided before the first appointment where the roads are not busy.

The method can preferably be carried out by the navigation device as a function of a voice input and/or an operating gesture, in particular a touch gesture. In other words, the method can optionally be initiated depending on a voice input and/or an operating gesture. This enables the method to be activated in a particularly uncomplicated manner.

According to a further embodiment of the method according to the disclosure, the navigation device can take into consideration journey-specific parameters. For this purpose, the navigation device can determine travel data, which are then taken into consideration by the provided agenda model. Such trip data can preferably be data on a predicted, journey-specific energy consumption. The travel plan can be adapted particularly well by way of such a further parameter, that is to say by way of the resulting even greater variety of different parameters.

A further embodiment of the method according to the disclosure can provide that the navigation device retrieves the data again during a journey and takes it into consideration in the agenda model, in particular the energy delivery device-specific data on, for example, the availability of the energy source or the energy delivery device and/or the environmental data. The navigation device can then re-plan or recalculate the determined travel plan as a function of this data. For example, if the user is on the move between two appointments and the navigation system receives the information "charging column is defective" or "charging column cannot be reserved", the travel plan can be adjusted without the user first having to drive to the defective or non-reservable charging column that was initially planned. If the charging station can be reserved, this can be particularly useful in a situation in which historical data indicate that the exemplary charging station is presumably free, but contrary to the forecast of the historical data, it should then be occupied.

The motor vehicle can preferably be an electric motor vehicle or a hybrid motor vehicle. The energy storage data of the motor vehicle can describe a state of charge and the energy delivery device can be a charging column. Optionally, in the case of the embodiment as a hybrid motor vehicle, the energy storage data can additionally describe a fill level of a fuel tank, and the energy delivery device can additionally include a fuel pump.

The object stated above is achieved by a storage medium having program code which, when executed by a processor device of a mobile terminal, is designed to cause the navigation device to carry out an embodiment of the method described above. The storage medium can be designed, for example, as a memory card or memory chip or other data memory. The advantages already mentioned result.

The object stated above is achieved by a mobile, portable terminal, for example a smartphone or a laptop or a tablet PC, having an embodiment of the storage medium according to the disclosure. It advantageously results for a user that he can, for example, carry out the travel planning at home on the evening before, or before he uses a rental car.

The object stated above is achieved by a server device for operation on the Internet, for example a data server, a backend, and/or a data cloud, wherein the server device includes an embodiment of the storage medium according to the disclosure.

The disclosure also includes the navigation device, in particular a navigation device for a motor vehicle. The navigation device includes a processor device which is designed to carry out an embodiment of the method according to the disclosure. For this purpose, the processor device can include at least one microprocessor and/or at least one microcontroller and/or at least one FPGA (Field Programmable Gate Array) and/or at least one DSP (Digital Signal Processor). Furthermore, the processor device can include program code which is designed to carry out the embodiment of the method according to the disclosure when it is executed by the processor device. The program code can be stored in a data memory of the processor device. The navigation device can be designed, for example, as a control chip or navigation device.

The object stated above is achieved by a motor vehicle which includes an embodiment of the navigation device according to the disclosure. The motor vehicle according to the disclosure is preferably designed as an automobile, in particular as a passenger car or truck, or as a passenger bus or motorcycle. The motor vehicle can preferably be designed as an electric motor vehicle or a hybrid motor vehicle. Even in areas with less good coverage with charging stations, a travel plan can be provided that reasonably integrates charging stops. This advantage therefore arises in particular when the motor vehicle is designed as a motor vehicle having a hydrogen drive, because the coverage with filling stations for such motor vehicles has not yet been very good, even in larger cities.

The disclosure also includes refinements of the devices according to the disclosure, which have features as have already been described in conjunction with the refinements of the method according to the disclosure. For this reason, the corresponding refinements of the devices according to the disclosure are not described again here.

BRIEF DESCRIPTION

The disclosure also comprises combinations of the features of the described embodiments.

Exemplary embodiments of the disclosure are described hereinafter. In the figures.

DETAILED DESCRIPTION

Figure 1:
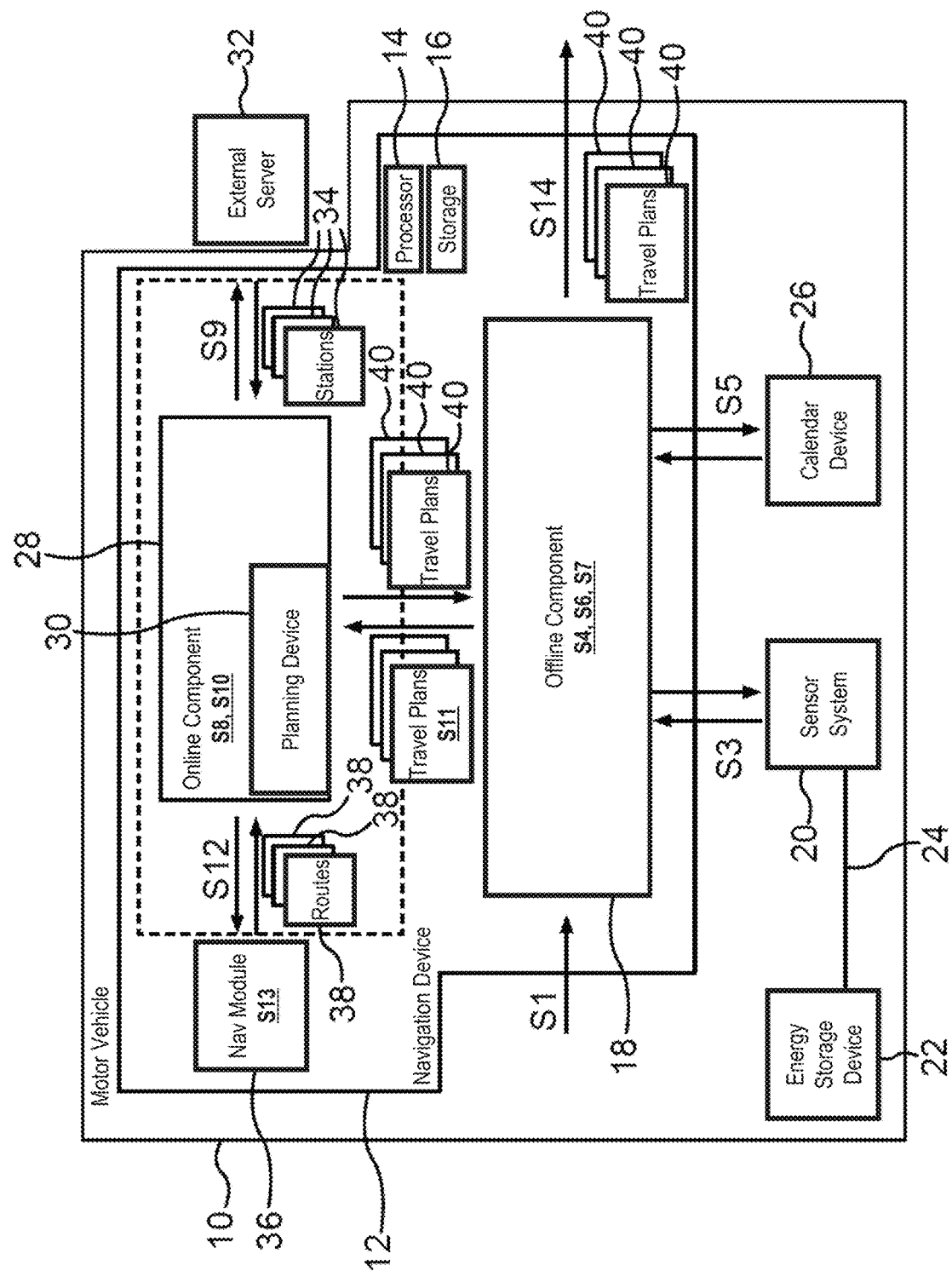
FIG. 1 shows a schematic illustration of an exemplary embodiment of the method according to the disclosure and the devices according to the disclosure.

The exemplary embodiments explained hereinafter are preferred embodiments of the disclosure. In the exemplary embodiments, the described components of the embodiments each represent individual features of the disclosure to be considered independently of one another, which each also refine the disclosure independently of one another. Therefore, the disclosure is also intended to comprise combinations of the features of the embodiments other than those shown. Furthermore, the described embodiments can also be supplemented by further features of the disclosure that have already been described.

In the figures, the same reference numerals designate elements that have the same function.

The figures illustrate the principle of the method according to the disclosure and accordingly the devices according to the disclosure on the basis of an exemplary embodiment. FIG. 1 illustrates an interaction flow for carrying out the method according to the disclosure. For this purpose, the figure shows a navigation device 12 of a motor vehicle 10, preferably an electric motor vehicle. Alternatively, the motor vehicle 10 can be designed, for example, as a vehicle having a hydrogen drive or as a hybrid motor vehicle.

FIG. 1 shows an optional processor device 14 of the navigation device 12 and an optional storage medium 16 on which program code for carrying out the method can be stored. The storage medium 16 can be designed, for example, as a memory card or memory chip.

The method can preferably be initiated by a speech input and/or an operating gesture, for example a movement of a hand in space or a touch on a touch-sensitive surface of the navigation device 12, or by pressing a button or a switch on the navigation device 12. For this purpose, the navigation device 12 can receive a corresponding operating action in optional method step S1. The navigation device 12 can optionally carry out gesture recognition (optional method step S2, not shown in FIG. 1).

An offline component 18 of the navigation device 12, i.e., a system or system part that carries out method steps and does not require any wired or wireless communication with motor vehicle-external communication partners, can also be referred to as an "e-charging service" (offline). This component of the navigation device 12 is preferably in bidirectional communication (S3) with a motor vehicle sensor system 20 which, for example, can transmit data about a current location of the motor vehicle and/or a current status, i.e., for example tank filling or state of charge, of an energy storage device 22 which can be designed as a traction battery or gasoline tank, and/or a current temperature of the energy storage device 22. A data communication connection 24 between the energy storage device 22 and the motor vehicle sensor system 20 can be, for example, a data bus of the motor vehicle 10 or a WLAN or Bluetooth connection.

A corresponding embodiment of such a motor vehicle sensor system 20 is known to a person skilled in the art from the prior art. Via this communication S3, the navigation device 12 can determine the departure location of the motor vehicle (S4), wherein this can be, for example a current location or a predicted departure location. As a further, optional energy storage-specific parameter, that is to say as further energy storage data, a current or predicted range can thus be determined in method step S4.

Optional motor vehicle-specific parameters are, for example, motor vehicle data about the motor vehicle 10 being an electric motor vehicle and/or being a specific model or including a specific model of a traction battery as the energy storage device 22.

In the example of the figure, a calendar device 26, for example a control chip or a data memory having a digital calendar, is shown in offline communication S5 with the offline component 18. The calendar device 26 can comprise a digital calendar program of the motor vehicle 10. By way of the communication S5, the navigation device 12 can acquire user-specific parameters in method step S6, i.e., user-specific appointment data for, for example, three appointments having respective location coordinates. The specified time range can be a whole day, for example.

As an alternative to the illustration in FIG. 1, the calendar device 26 can also be a component of a mobile terminal (not shown in FIG. 1), wherein then the communication S5 cannot take place with the offline component 18, but with an online component 28, which can also be referred to as "e-charging service" (online), and/or as "smart service". The online component 28 can be designed and configured for communication via preferably wireless data communication, for example via an Internet connection, mobile wireless connection, and/or WLAN or Bluetooth connection. The online component 28 can be designed as a control chip or part of a control chip and can preferably include a planning device 30, that is to say a part which, as described further below, is designed and configured to determine travel plans (S13). The planning device 30 can also be referred to as a "planning component". In other words, the appointment data S6 can optionally be determined by the online component 28.

The user-specific appointment data preferably also describe a duration of the respective appointment.

Further, optional user-specific data can, for example, be data relating to a personal driving style of the user, wherein these data are also able to be determined, for example, via a driver assistance system of the motor vehicle 10.

From such a driver assistance system (not shown in FIG. 1), journey-specific data, so-called journey data, can also be determined (S7), for example data on a predicted journey-specific energy consumption, which can depend on individual travel sections between two appointments and/or a traffic situation. For example, it can make a difference whether there is a high volume of traffic in the time between two appointments or before the first appointment and, for example, it can be foreseen that the motor vehicle 10 will not be driving smoothly, but will be underway in a stop-and-go journey. Such motor vehicle-external environmental data can preferably be determined by the optional online component 28 (S8).

Such motor vehicle-external environmental data can include traffic information and/or weather data. When creating the travel plan (S13), the weather data can later influence whether the vehicle is making good progress between two appointments, for example, and a charging stop can also be planned, or whether more time is likely to be needed for the journey in snow conditions, so that a charging stop between these two appointments may be less reasonable. The motor vehicle-external environmental data can be retrieved from a motor vehicle-external server (not shown in FIG. 1).

From another motor vehicle-external data server 32, which can communicate with the online component 28, for example via a mobile wireless or Internet communication S9, the navigation device 12 can retrieve and thus determine energy delivery device-specific parameters (S10), i.e., data about the locations of at least one charging column and/or gas station, and, for example, information about the reservability of the exemplary charging column and/or gas station, and/or even a current availability of the energy delivery device. Information on three charging stations 34 is illustrated symbolically in FIG. 1.

The route calculation S13 for traveling to the appointments can optionally be carried out by a navigation module 36 of the navigation device 12. This can in particular be in bidirectional communication S12 with the planning device 30 and create possible routes 38 symbolically shown in FIG. 1 and transmit them to the planning device 30. Optionally, the navigation module 36 can be part of the planning device 30, or the planning device 30 can be a part of the navigation module 36.

The route calculation S13 takes place on the basis of a digital agenda model provided in method step S11, which can preferably be provided by the planning device 30.

Ideally, upon provision of the agenda model S11 and the travel plan calculation S13, expected charging and/or filling times are taken into consideration.

For example, if the user has specified as a standard setting that the travel plan should prioritize a maximum cost or take into consideration the lowest possible cost of the loading and/or filling process, the agenda model can describe current charging and/or gasoline prices, and when creating the travel plan S13 such charging and/or gas stations can then be preferred.

If the user prioritizes the least possible delay in travel time, then charging and/or refueling stops can be preferred for those charging and gas stations that are located near an appointment location or a location for a lunch break. If the predicted or current state of charge then permits it, the energy storage device 22 can then be charged during the lunch break in the nearby charging station.

For example, FIG. 1 symbolizes three created travel plans 40, all of which can be transmitted to an output device (not shown in FIG. 1) so that the user can view the selection and select a travel plan. Alternatively, a particularly reasonable travel plan can be selected by the navigation device 12 from the exemplary plurality of travel plans and transmitted, for example, to the driver assistance system of the motor vehicle 10. If the motor vehicle 10 is a piloted motor vehicle, the motor vehicle 10 can independently travel a prioritized travel route for traveling to the appointments and charging stops. In the exemplary lunch break, such a piloted motor vehicle can then also drive to the charging stop independently, that is to say without the driver, and then come back to the location of the lunch break again after charging to pick up the driver.

Alternatively, a travel route for traveling to the appointments can be output, for example, by the navigation module 36 by way of navigation instructions, so that the driver can travel along the travel route using the navigation instructions of the navigation module 36.

Figure 2:
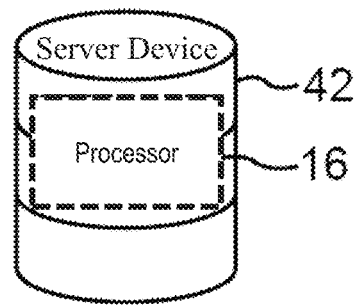
FIG. 2 shows a schematic illustration of an exemplary embodiment of a server device according to the disclosure.

FIG. 2 illustrates an exemplary embodiment of a motor vehicle-external server device 42, which can be designed, for example, as a data server or data cloud. The storage medium 16 can be a memory chip or a hard disk.

Figure 3:
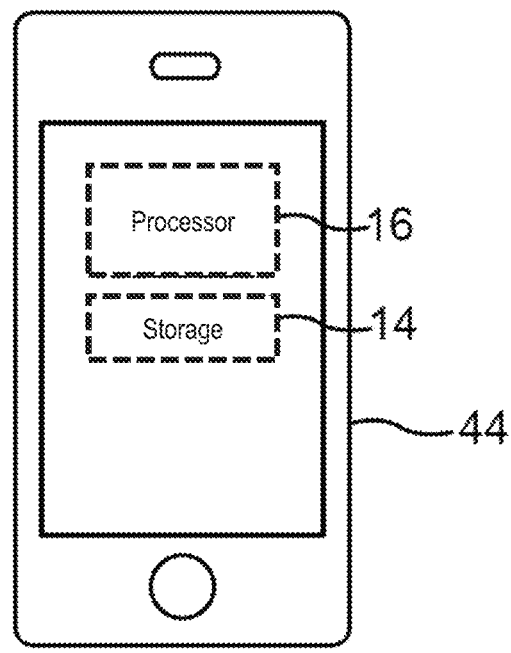
FIG. 3 shows a schematic illustration of an exemplary embodiment of a mobile terminal according to the disclosure.

FIG. 3 shows an example of a mobile terminal 44, for example a tablet PC or a smartphone.

Figure 4:
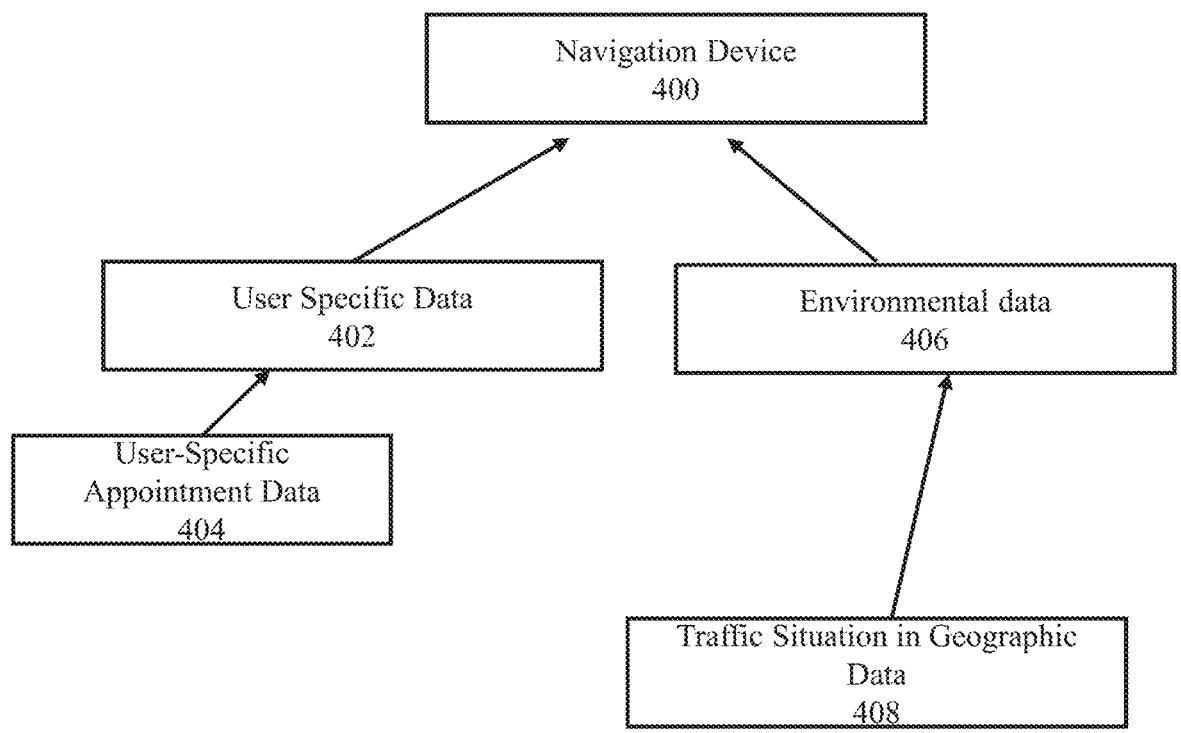
FIG. 4 shows a navigation device data illustration of an exemplary embodiment according to the disclosure.

FIG. 4 shows an example of a navigation device 400 and its data inputs. The data inputs may include user-specific data 402, which may include user-specific appointment data 404. The data inputs may also include environmental data 406, which may include traffic situation in the geographic area 408.

Figure 5:
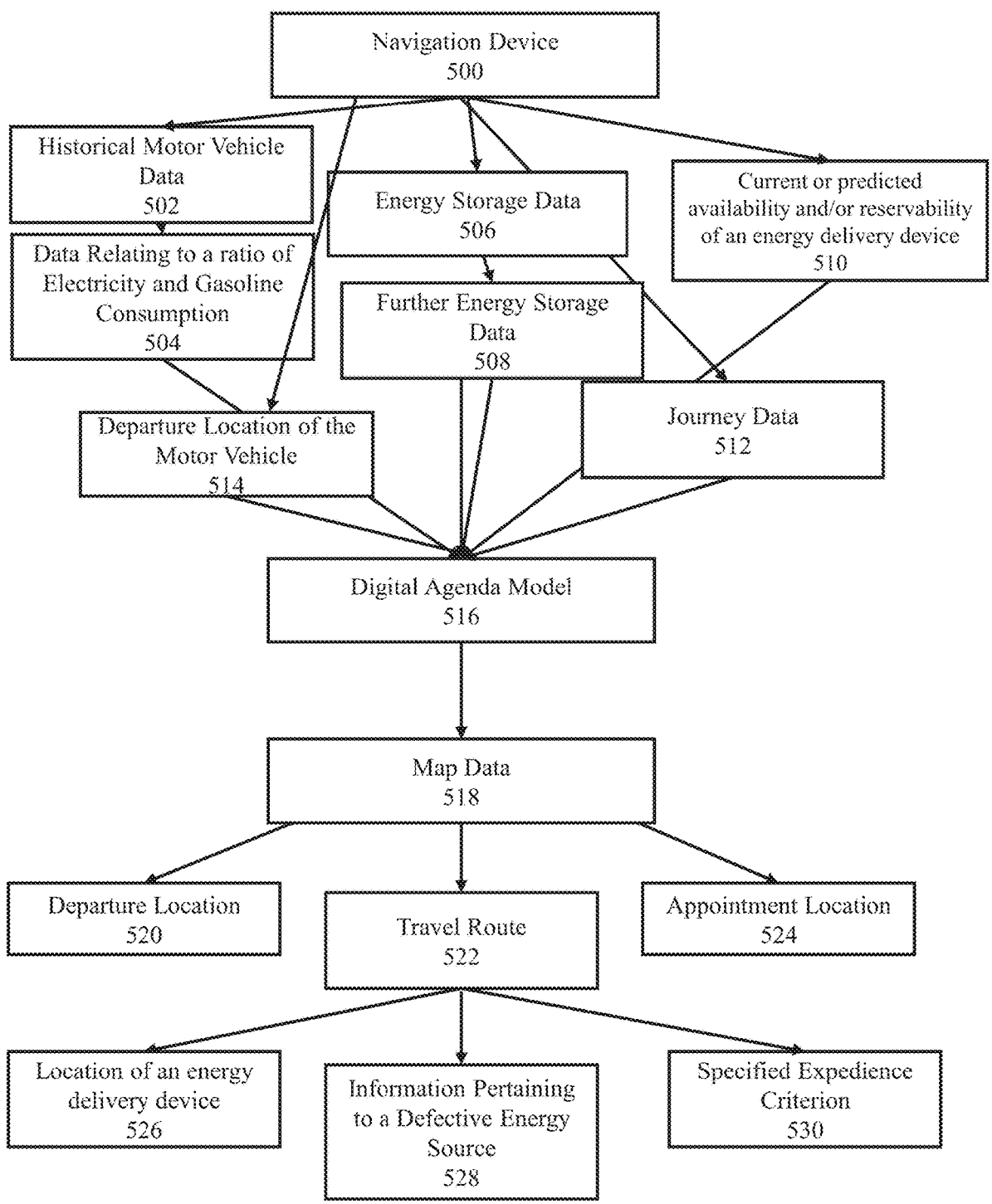
FIG. 5 shows a navigation device map illustration of an exemplary embodiment according to the disclosure.

FIG. 5 shows an example of a navigation device 500 and its data outputs. The data outputs may include historical motor vehicle data 502 such as data relating to a ratio of electricity and gasoline consumption 504. Other data outputs may include energy storage data 506 and further energy storage data 508, current or predicted availability and/or reservability of an energy delivery device 510, journey data 512, and/or departure location of the motor vehicle 514. The data outputs may be used for a digital model agenda 516 which may generate map data 518. The map data 518 may include a departure location 520, a travel route 522, and/or appointment location 524. The travel route 522 may further include additional information such as a location of an energy delivery device 526, information pertaining to a defective energy source 528, and/or specified expedience criterion 530.

Figure 6:
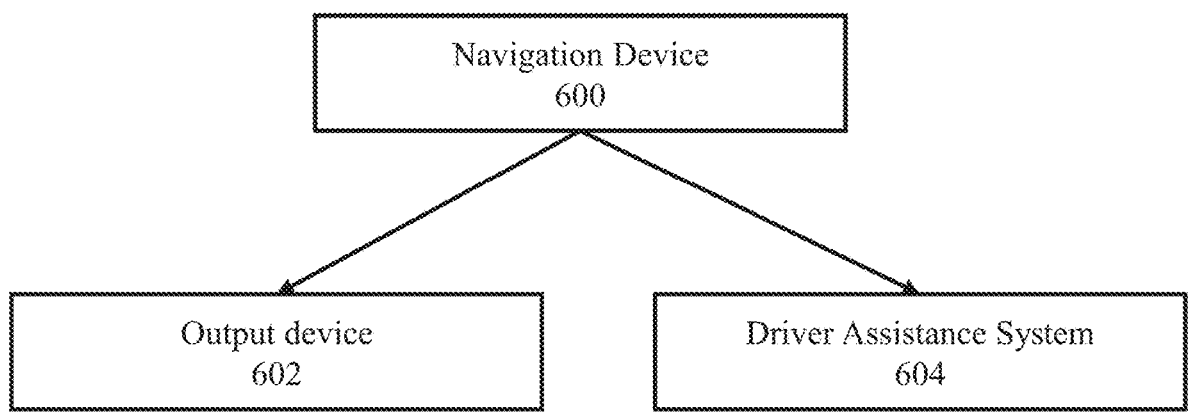
FIG. 6 shows a navigation device output illustration of an exemplary embodiment according to the disclosure.

FIG. 6 shows an example of a navigation device 600 and its outputs. The outputs may include an output device 602 and/or a driver assistance system 604.

Overall, the examples show how the disclosure can provide synergistic charging and/or refueling stop planning.

For example, intuitive and automated charging stop planning can be provided, which can preferably take into consideration items of calendar information (appointments), driving times, a (personal) driving style, power consumption, weather influences, and/or a traffic situation (traffic jam).

A one-touch solution and/or a speech-based charging stop planning system can preferably be provided.

The individual planning steps can preferably be carried out by the system, in particular by the navigation device 12, for example by querying the appointments in the calendar. The initialization can preferably be done by the user by speech or touch. The synergistic charging stop planning accesses a wide range of items of background information, for example calendar, items of traffic jam information, prediction of availability, battery status, current range, driving style, vehicle type, and generates optimized route(s). Optionally, inexpensive, fast, $CO_2$-optimized, safe (in terms of availability) routes can be calculated, preferably routes having a shorter/longer charging time, having fewer/more stops, having less/greater amount of remaining energy.

Advantages include: The user only needs one interaction step for the complete planning. The initial call of the user to activate the charging stop planning is preferably done verbally and/or by touch interaction. The user does not have to carry out any complex planning processes himself. For the user there is also a faster and more accurate planning result, the cognitive load is reduced (during the journey, but also before the journey), and the range anxiety is reduced or even eliminated.

The invention claimed is:

1. A method for coordinating charging and/or filling of an energy storage device of a motor vehicle, wherein a navigation device for a specified time range:
    determines user-specific appointment data with location coordinates associated with at least one appointment,
    determines a departure location of the motor vehicle at a beginning of the specified time range and energy storage data, wherein the energy storage data describe a state of charge and/or a fill level of the energy storage device at the beginning of the specified time range,
    determines environmental data which describe at least one journey-relevant, motor vehicle-external environmental parameter,
    provides a digital agenda model which describes the determined appointment data, map data of a geographic area that comprises the location coordinates associated with at least one appointment, the departure location of the motor vehicle, and at least one location of an energy delivery device, and describes the determined environmental data,
    on the basis of the provided agenda model, determines at least one travel plan having a travel route for keeping the at least one appointment, wherein as a function of the determined energy storage data, the respective travel route takes into consideration the at least one location of the energy delivery device as an intermediate destination having a charging and/or filling time, so that the intermediate destination fulfills a specified expediency criterion, and
    transmits the at least one determined travel plan to an output device and/or to a driver assistance system of the motor vehicle,
    wherein the motor vehicle has self-driving capabilities and, after a user disembarks from the motor vehicle at one of the respective locations, the motor vehicle pilots itself to the intermediate destination for charging and then returns to pick up the user,
    wherein the navigation device further determines user-specific data which comprises a driving style of the user for consideration in the provided agenda model,
    wherein the respective travel route further takes into consideration the driving style of the user and prefers roads which are suited to the driving style of the user, and
    wherein, during travel along the travel plan, the navigation device is configured to receive information pertaining to a defective energy source and correspondingly adjust the travel plan to avoid the defective energy source, and
    wherein the motor vehicle is a hybrid motor vehicle and the navigation device determines historical motor vehicle data relating to a ratio of electricity and gasoline consumption of the hybrid motor vehicle for consideration in the provided agenda model on the basis of which the at least one travel plan is determined.

2. The method according to claim 1, wherein the specified expediency criterion prescribes a least possible delay in travel time.

3. The method according to claim 1, wherein the navigation device determines further energy storage data comprising a battery status and/or a current or predicted range for consideration in the provided agenda model.

4. The method according to claim 1, wherein the navigation device determines a current or predicted availability and/or a reservability of an energy delivery device for consideration in the provided agenda model.

5. The method according to claim 1, wherein the environmental data comprises data on a traffic situation in the geographic area and/or weather data.

6. The method according to claim 1, wherein the method is carried out in response to a speech input of the user.

7. The method according to claim 1, wherein the navigation device determines journey data comprising a predicted, journey-specific energy consumption for consideration in the provided agenda model.

8. A non-transitory computer-readable storage medium having program code which is designed to carry out the method according to claim 1 when executed by a processor device of a mobile terminal.

9. A mobile, portable terminal comprising the storage medium according to claim 8.

10. A server device for operation on the Internet, comprising the storage medium according to claim 8.

11. The method according to claim 1, wherein the specified expediency criterion prescribes a lowest possible cost of the charging and/or filling process.

12. The method according to claim 1, wherein the specified expediency criterion prescribes an energy carrier which provides charge and/or fuel from a renewable energy source.

13. The method according to claim 1, wherein the navigation device determines further energy storage data comprising a predicted range taking into consideration the driving style of the user.

* * * * *